(12) United States Patent
Otsuki et al.

(10) Patent No.: US 6,560,389 B2
(45) Date of Patent: May 6, 2003

(54) BEAM-SPLITTING/COUPLING APPARATUS HAVING FRAME HOLDING OPTICAL FILTER

(75) Inventors: Motohiko Otsuki, Miyagi-ken (JP); Kimihiro Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 132 days.

(21) Appl. No.: 09/852,387

(22) Filed: May 9, 2001

(65) Prior Publication Data

US 2002/0025119 A1 Feb. 28, 2002

(30) Foreign Application Priority Data

May 22, 2000 (JP) .................................... 2000-154436
May 22, 2000 (JP) .................................... 2000-154437

(51) Int. Cl.$^7$ ................................................ G02B 6/26
(52) U.S. Cl. ............................ 385/47; 385/89; 385/31; 385/56; 359/127
(58) Field of Search ......................... 385/47, 89, 140, 385/37, 60, 31, 56, 24, 93; 359/127

(56) References Cited

U.S. PATENT DOCUMENTS

| | | | | |
|---|---|---|---|---|
| 4,701,010 A | * | 10/1987 | Roberts | ........................ 385/31 |
| 4,904,044 A | * | 2/1990 | Tamulevich | .................. 385/56 |
| 5,799,120 A | | 8/1998 | Kurata et al. | |
| 5,859,717 A | * | 1/1999 | Scobey et al. | .............. 359/124 |
| 6,142,680 A | * | 11/2000 | Kikuchi et al. | ................ 385/93 |
| 6,392,508 B1 | * | 5/2002 | Damphousse et al. | ....... 333/209 |
| 6,418,250 B1 | * | 7/2002 | Corbosiero et al. | ........... 385/24 |

\* cited by examiner

*Primary Examiner*—Hemang Sanghavi
*Assistant Examiner*—Eric Wong
(74) *Attorney, Agent, or Firm*—Beyer Weaver & Thomas, LLP

(57) ABSTRACT

A beam-splitting/coupling apparatus comprises first and second frame member which each have a contact surface and a beam guide path. An optical filter is provided between the contact surfaces with the front and rear surfaces of the optical filter held by the first and second frame members respectively. The first and second frame members are held in a case by external flexible forces. A beam propagates from the beam guide path of the first frame member to the beam guide path of the second frame member by way of the optical filter.

As a result, the optical filter can be installed firmly with ease. In addition, the effect of the installed optical filter on optical performance can be reduced.

2 Claims, 7 Drawing Sheets

BEAM-SPLITTING/COUPLING APPARATUS HAVING FRAME HOLDING OPTICAL FILTER

BACKGROUND OF THE INVENTION

1. Field of the Invention

The present invention relates to a beam-splitting/coupling apparatus for splitting or coupling beams propagating through a plurality of optical fibers. More particularly, the present invention relates to a beam-splitting/coupling apparatus with a devised structure for firmly holding an optical filter in the apparatus.

2. Description of the Related Art

In recent years, in place of an electrical communication system for transmitting electrical signals through electrical wires, there has been implemented an optical communication system (an optical LAN) using optical fibers for, among other purposes, increasing the amount of transmitted information, reducing the weight of the communication system and making the construction work simple.

The optical communication system employs beam-splitting/coupling apparatuses each used for connecting a plurality of optical fibers, splitting a beam and coupling beams.

In the case of the conventional beam-splitting/coupling apparatus, an end of an optical fiber is placed on a specific side of a case having a cubic shape. An end of another optical fiber is placed on another side of the case. The other side is a side facing the specific side. An optical filter is provided inside the case, forming an angle of about 45 degrees with the optical axial line of each of the optical fibers. In addition, an end of a further optical fiber is placed on a further side of the case. This further side is orthogonal to the optical axial lines of the specific and other optical fibers.

The optical filter is attached to the case by soldering or by using an adhesive member such as an adhesive agent. The optical filter passes on a beam emitted by one of the optical fibers to another one of the optical fibers. On the other hand, a beam reflected by the optical filter enters the end of the remaining optical fiber.

As described above, in the beam-splitting/coupling apparatus, optical components of a beam emitted from an end of an optical fiber, which have wavelengths in a predetermined wavelength range, pass through an optical filter. On the other hand, optical components having wavelengths outside the predetermined wavelength range are reflected by the optical filter.

By the way, since the optical filter is an extremely small component, an excessive portion of the adhesive member used for attaching the filter to the case protrudes into the inside of an optical path, causing a fear of a negative effect on the optical performance of the optical filter.

In a process of attaching the optical filter to the case, it is feared that there is a negative effect on the optical performance if the optical filter is installed in a state of distortion. It is thus necessary to install the optical filter in the case very carefully, raising problems of a difficult assembly process which entails much time as well as labor.

SUMMARY OF THE INVENTION

It is thus an object of the present invention addressing the problems described above to provide a beam-splitting/coupling apparatus that allows an optical filter to be installed in a case of the apparatus with ease and an effect on the optical performance of the installed optical filter to be reduced.

As a first solution means for solving at least one of the problems described above, there are provided a first frame member having a contact surface as well as a beam guide path and a second frame member also having a contact surface as well as a beam guide path. An optical filter is provided between the contact surfaces with the front and back surfaces of the optical filter are held between the first and second frame members. The first and second frame members are each held inside a case by an external flexible pressure. A beam from the beam guide path of the first frame member propagates to the beam guide path of the second frame member by way of the optical filter.

As a second solution means, a pair of walls is set inside the case with the walls separated from each other. The first and second frame members are installed with outer wall portions of the first and second frame members put on between the walls.

As a third solution means, the contact surfaces of the first and second frame members are each formed in a slanting orientation relative to the direction in which one of the contact surfaces is opposite to each other. In addition, a step portion is formed on each of the contact surfaces. Mutually facing side-edge surfaces of the optical filter are held between the step portions under external flexible pressures.

As a fourth solution means, a protrusion is formed on at least one of the contact surfaces of the first and second frame members. A low-edge surface of the optical filter is mounted on the protrusion.

PREFERRED EMBODIMENTS OF THE INVENTION

A preferred embodiment implementing a beam-splitting/coupling apparatus 10 provided by the present invention is explained by referring to FIGS. 1 to 11.

Figure 1:
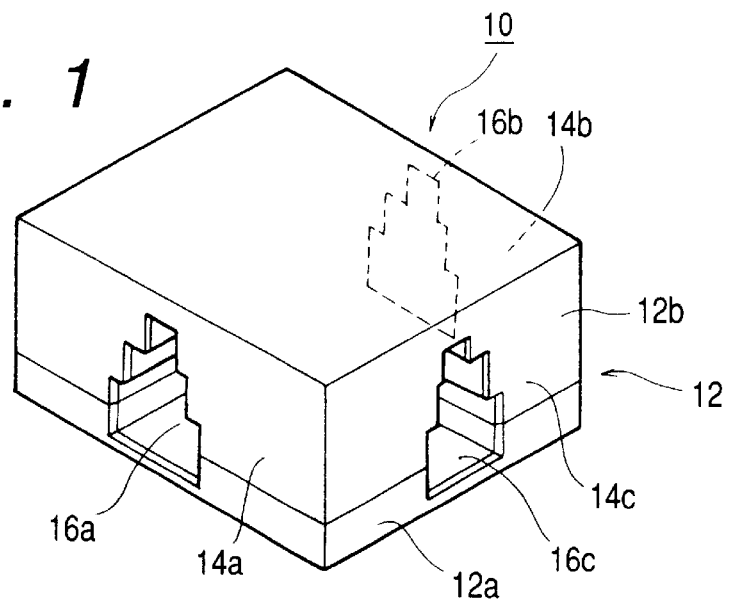
FIG. 1 is a diagram showing a perspective view of a beam-splitting/coupling apparatus implemented by an embodiment of the present invention.

As shown in FIG. 1, the beam-splitting/coupling apparatus 10 is a case 12 made of black-color resin. The case 12 comprises a lower case 12a having a square shape and an upper case 12b having a rectangular-parallelepiped shape and a cavity inside. The upper case 12b is put on the lower case 12a to form a single body of the case 12.

The case 12 has first, second and third sidewalls 14a, 14b and 14c. First, second and third installation holes 16a, 16b and 16c are formed on the first, second and third sidewalls 14a, 14b and 14c respectively. The cross sections of the first, second and third installation holes 16a, 16b and 16c each have a protruding shape.

Ends of optical fibers not shown in the figure are inserted into the first, second and third installation holes 16a, 16b and 16c.

Figure 4:
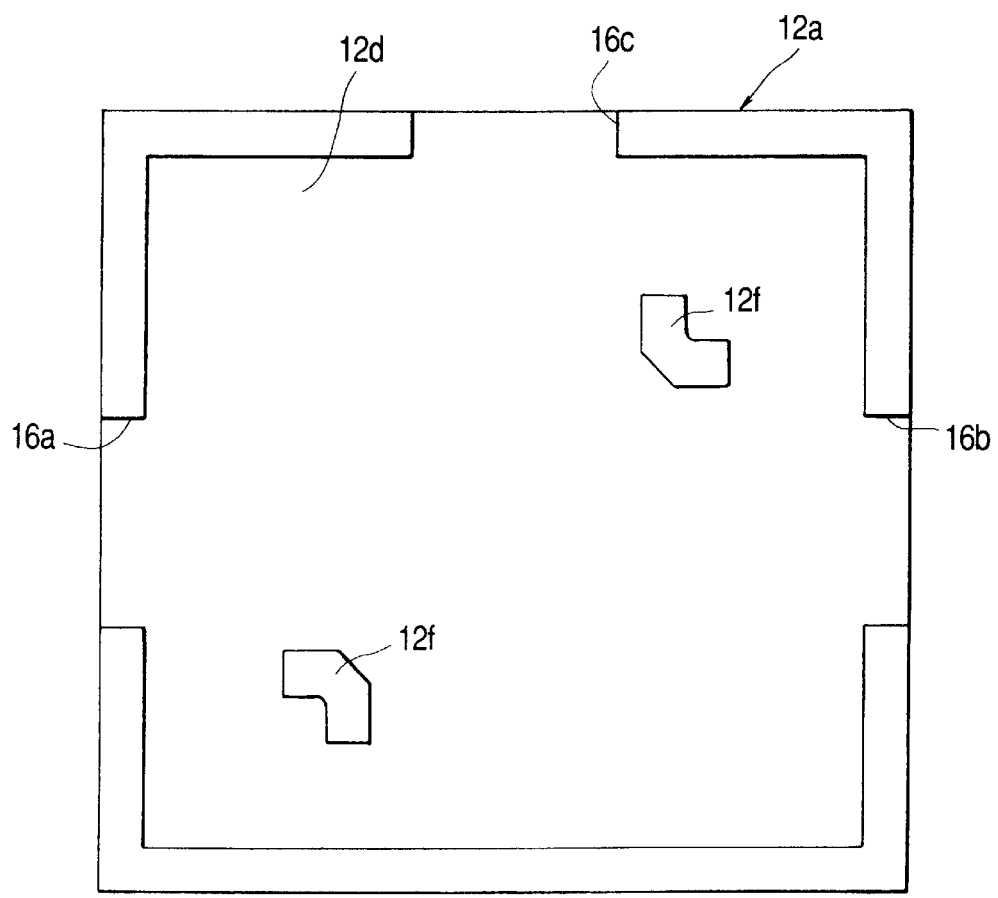
FIG. 4 is a diagram showing a top view of a lower case of the beam-splitting/coupling apparatus implemented by the embodiment of the present invention.

As shown in FIG. 4, on the upper surface of the bottom 12d of the lower case 12a, protruding pieces 12f each having an L-character shape are stood to form a single body with the lower case 12a, being separated away from each other by a predetermined distance.

Figure 3:
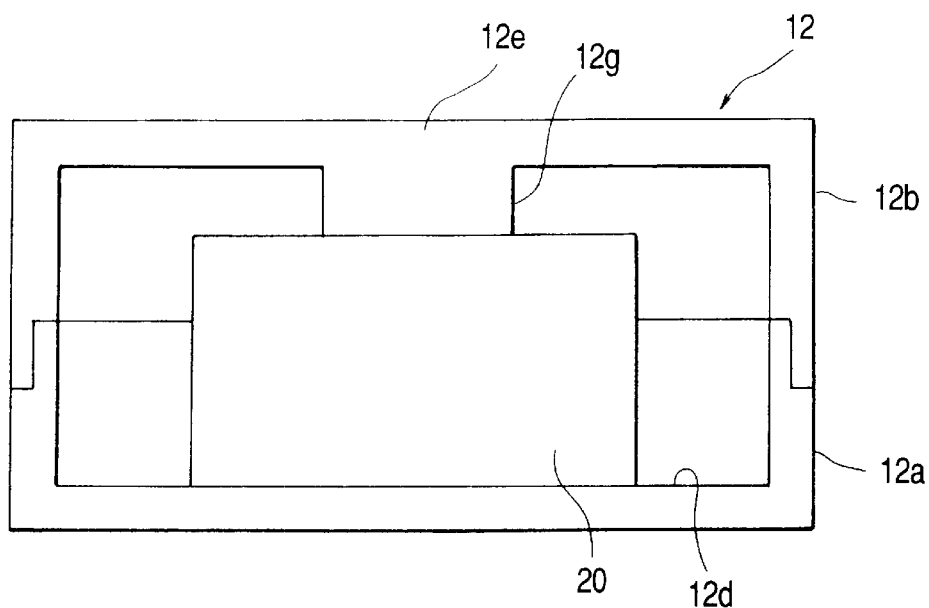
FIG. 3 is a diagram showing a cross section of the beam-splitting/coupling apparatus implemented by the embodiment of the present invention.

As shown in FIG. 3, a cylindrical protrusion 12g is disposed on the inner-wall side of the upper surface of the upper case 12b to form a single body with the upper case 12b.

As shown in FIGS. 5 to 9, a frame 20 which has a cruciform cross section and is made of black-color resin comprises a first frame member 21 and a second frame member 22.

Figure 5:
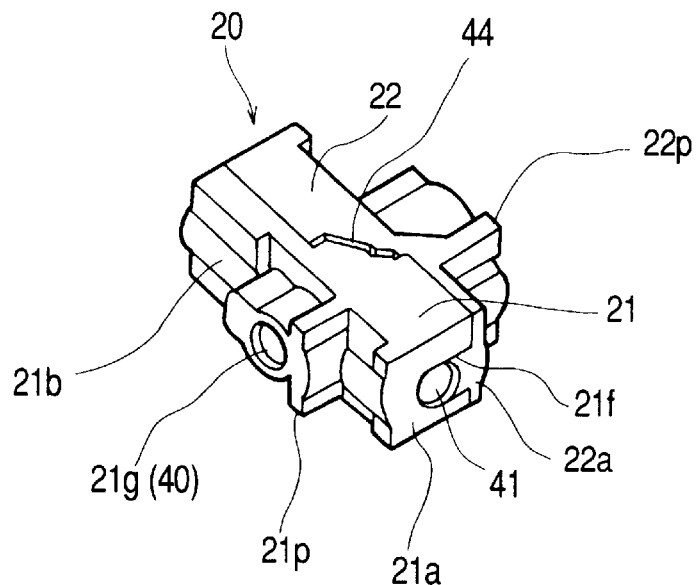
FIG. 5 is a diagram showing an enlarged perspective view of a frame of the beam-splitting/coupling apparatus implemented by the embodiment of the present invention.
Figure 7:
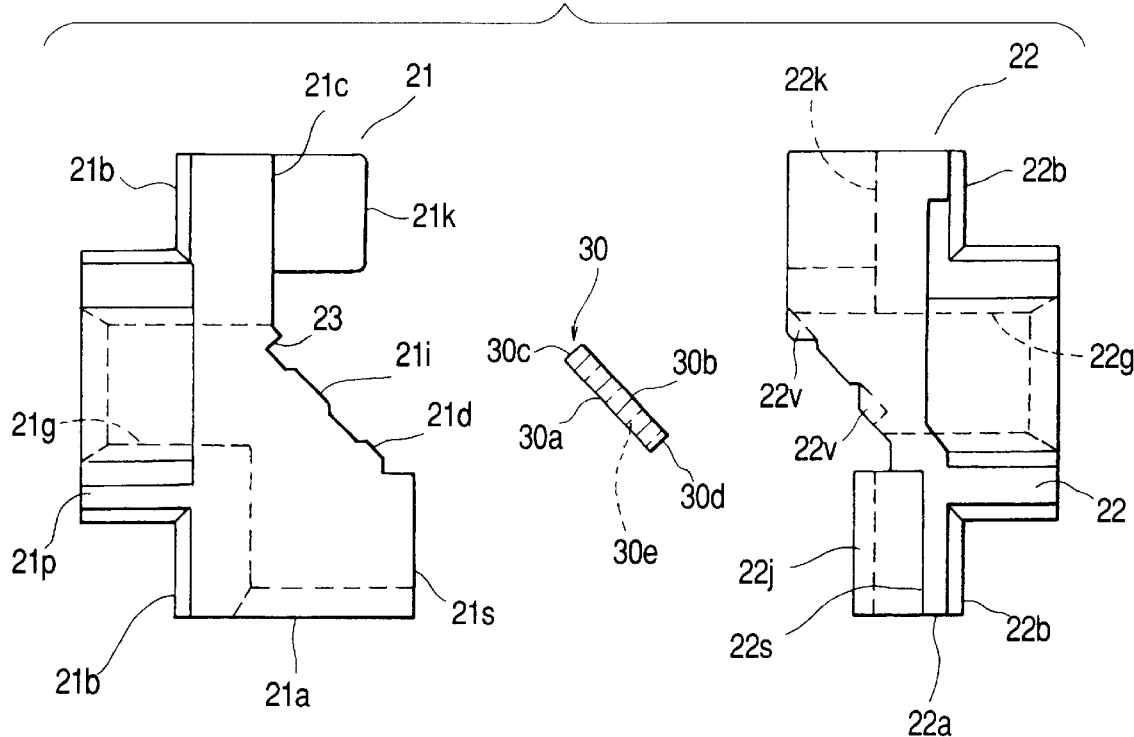
FIG. 7 is a diagram showing a top view of a disassembled state of the frame shown in FIG. 5.
Figure 8:
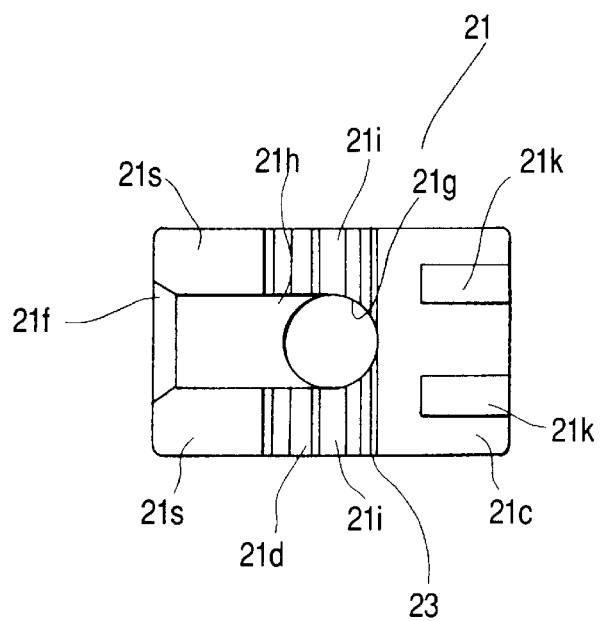
FIG. 8 is a diagram showing a side view of a contact portion of a first frame member pertaining to the frame shown FIG. 5.

As shown in FIGS. 5, 7 and 8, the first frame member 21 comprises a front wall 21a, a first sidewall 21b, a first inner wall 21c, a pair of first side edges 21s and a first installation surface (contact surface) 21d. The front wall 21a has a U groove 21f having a shape resembling the U character. The first sidewall 21b has a through hole 21g with its center having a cylindrical shape. The first inner wall 21c is placed on the back side of the first sidewall 21b at a location separated away from the front wall 21a. The pair of first side edges 21s is also placed on the back side of the first sidewall 21b, being linked to the front wall 21a. The first installation surface 21d is provided between the pair of first side edges 21s and the first inner wall 21c in a slanting orientation relative to the axial direction of the through hole 21g, being set in an erected posture.

As shown in FIG. 8, the center of the first installation surface 21d is bored to form a hole 21h linked to the through hole 21g and the U groove 21f.

As shown in FIG. 7, protrusion 21i each having a rectangular shape are formed on the upper and lower sides of the hole 21h respectively on the front surface of the first installation surface 21d, slightly protruding from the surface.

In addition, the boundary between the first installation surface 21d and the first inner wall 21c is a step portion 23 set perpendicularly to the first installation surface 21d, slightly protruding from the first installation surface 21d.

On the first inner wall 21c, an engagement protrusion 21k comprising a pair of protrusions is provided, being set to form a single body with the surface of the first inner wall 21c.

As shown in FIG. 5, on the outer wall of the cylindrical portion of the first sidewall 21b, a side plate 21p having a planar shape is provided to form a single body with the outer wall.

Figure 9:
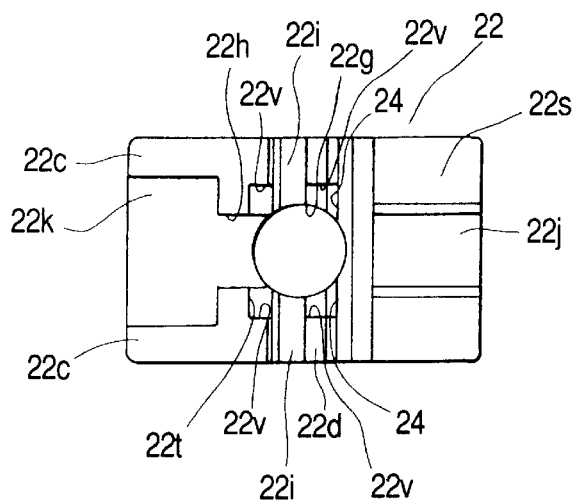
FIG. 9 is a diagram showing a side view of a contact portion of a second frame member pertaining to the frame shown in FIG. 5.

As shown in FIGS. 5, 7 and 9, the second frame member 22 comprises a front wall 22a, a second sidewall 22b, a pair of second side edges 22c, a third inner wall 22s and a second installation surface (contact surface) 22d. The front wall 22a has a shape resembling the T character. The second sidewall 22b has a through hole 22g with its center having a cylindrical shape. The pair of second side edges 11c is placed on the back side of the second sidewall 22b at a location separated away from the front wall 22a. The third inner wall 22s is also placed on the back side of the second sidewall 22b, being linked to the front wall 22a. The second installation surface 22d is provided between the third inner wall 22s and the pair of second side edges 22c in a slanting orientation relative to the axial direction of the through hole 22g, being set in an erected posture.

The center of the second installation surface 22d is bored to form a hole 22h linked to the through hole 22g and an engagement recess 22k formed between the pair of second side edges 22c with a recessed shape.

On the second installation surface 22d, a rectangular recess 22t slightly lower than the circumferential edge of the hole 22h at the center of the second installation surface 22d is formed. As a result, at the corners on both the left and right sides of the second installation surface 22d, four protrusions 22v are provided.

In addition, on the boundary between the third inner wall 22s on the second installation surface 22d and the rectangular recess 22t, a step portion 24 is set perpendicularly to the second installation surface 22d, slightly protruding from the second installation surface 22d.

On the front surface of the second installation surface 22d, slightly recessed depression 22i sandwich the hole 22h. The depressions 22i are formed on the upper and lower sides of the hole 22h, having identical rectangular shapes. Inside the rectangular recess 22t, the depressions 22i slightly protrude.

On the third inner wall 22s, a curved protrusion 22j is disposed. The curved protrusion 22j has a curved shape with the center thereof protruding.

Figure 6:
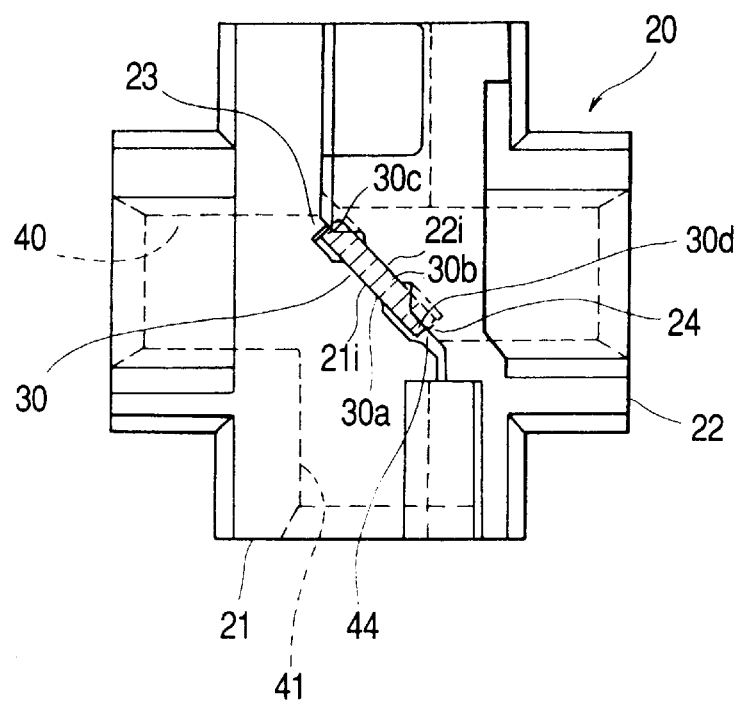
FIG. 6 is a diagram showing a top view of the frame shown in FIG. 5.

In addition, as shown in FIGS. 5 and 6, in the frame 20, an engagement protrusion 21k of the first frame member 21 is engaged with an engagement protrusion 22k of the second frame member 22, and the pair of first side edges 21s is brought into contact with the third inner wall 22s. The curved protrusion 22j of the second frame member 22 is engaged with the inside of the U groove 21f of the first frame member 21.

As a result, a through hole 40 and a through hole 41 are provided. The through hole 40 serves as a beam guide path which is a continuation hole from the through the hole 21g of the first frame member 21 and the through hole 22g of the second frame member 22. The through hole 40 has the same inner diameter as those of the through hole 21g and the through hole 22g. The through hole 41 is formed perpendicularly to the through hole 40.

The first installation surface 21d of the first member 21 faces the second installation surface 22d of the second frame member 22, and a grove 44 for mounting an optical filter to be described later is formed at an interface position between the first installation surface 21d and the second installation surface 22d.

As shown in FIG. 7, an optical filter 30 is made of resin or optical glass with a rectangular shape. The optical filter 30 has a front surface 30a, a back surface 30b, side-end surfaces 30c and 30d on both the sides and a low-edge surface 30e. On each of the front surface 30a and the back surface 30b, there is formed a metallic thin film not shown in the figure.

Typically, when an incident beam hits the front surface 30a of the optical filter 30, the beam's optical components each having a wavelength in a predetermined wavelength range are passed on to the back surface 30b while other optical components are reflected by the front surface 30a in a beam-splitting phenomenon. When incident beams from two directions enter the optical filter 30, on the other hand, the beams are coupled in a beam-coupling phenomenon.

As shown in FIG. 6, the optical filter 30 is provided in the groove 44 of the frame 20, being held by external flexible pressure between the protrusion 21i of the first frame member 21 and the depressions 22i of the second frame member 22. To put in detail, the front surface 30a and the back surface 30b are brought into contact with the protrusion 21i and the depressions 22i respectively.

Figure 10:
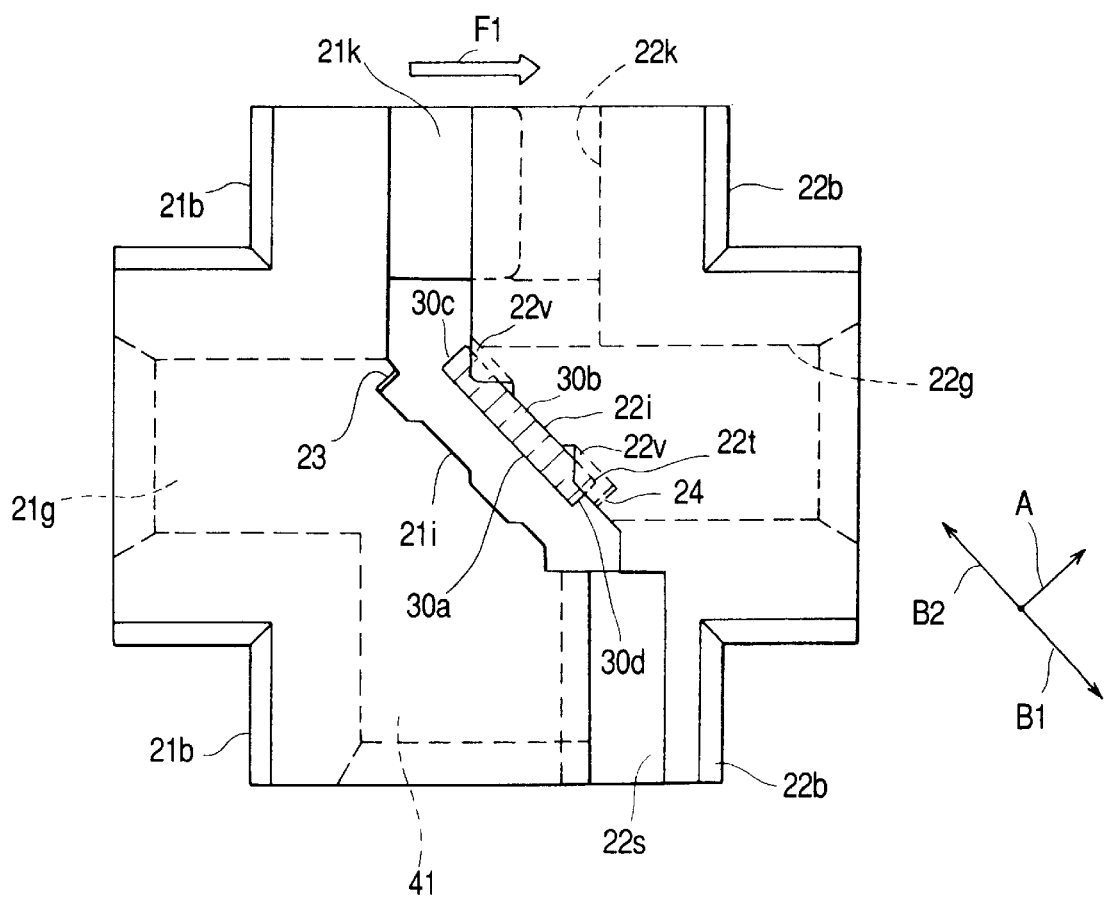
FIG. 10 is an explanatory diagram showing an enlarged top view of an assembly of the frame shown in FIG. 5.

The optical filter 30 is plugged into the rectangular recess 22t of the second frame member 22. The low-edge surface 30e is mounted on the protrusion 22v in the rectangular recess 22t to position the optical filter 30. In this posture, the movement of the optical filter 30 in the transversal direction indicated by an arrow A in FIG. 10 is restricted. The side-end surface 30d is brought into contact with the step portion 24 of the second frame member 22 to restrict the movement of the optical filter 30 in a direction parallel to the surface of the second installation surface 22d, that is, a direction indicated by an arrow B1 in FIG. 10. Similarly, the side-end surface 30c is brought into contact with the step portion 23 of the first frame member 21 to restrict the movement of the optical filter 30 in a direction parallel to the surface of the first installation surface 21d, that is, a direction indicated by an arrow B2 in FIG. 10.

In this way, the optical filter 30 is installed surely and firmly in the frame 20.

Figure 2:
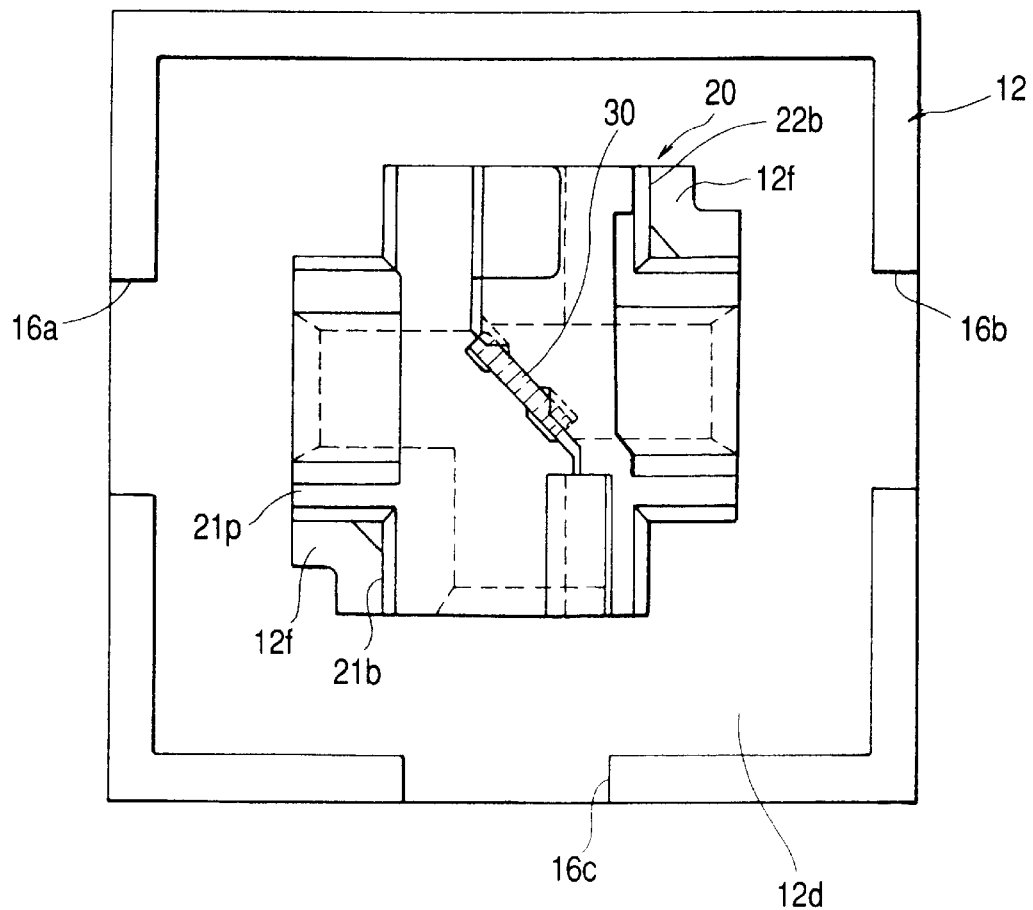
FIG. 2 is a diagram showing a top view of the beam-splitting/coupling apparatus implemented by the embodiment of the present invention with an upper case thereof removed.

As shown in FIGS. 2 and 3, the side plate 21p of the first frame member 21 and a portion of the first sidewall 21b are engaged with one of the protruding piece 12f in the frame 20 accommodating the optical filter 30, holding the protruding piece 12f between them. On the other hand, the second sidewall 22b of the second frame member 22 and the outer wall of the cylindrical portion thereof are engaged with the other protruding piece 12f, holding the protruding piece 12f between them. In this way, the first frame member 21 and the second frame member 22 are attached to the surface of the bottom 12d of the lower case 12a.

Next, the assembly of the beam-splitting/coupling apparatus 10 is explained by referring to FIGS. 10 and 11 as follows.

First of all, the second frame member 22 is prepared. The optical filter 30 is mounted downward inside the rectangular recess 22t by using an assembly tool not shown in the figure by setting the second installation surface 22d in a horizontal orientation so as to make the direction indicated by the arrow A shown in FIG. 10 coincide with the transversal direction of the optical filter 30.

Next, the engagement protrusion 21k of the first frame member 21 is inserted into the engagement protrusion 22k of the second frame member 22 by bringing the engagement protrusion 21k into contact with the engagement protrusion 22k and sliding the engagement protrusion 21k along the engagement protrusion 22k. At the same time, the curved protrusion 22j of the third inner wall 22s is inserted into the U groove 21f. In this way, the first inner wall 21c is brought into contact and engaged with the second sidewall 22b whereas the pair of first side edges 21s is brought into contact and engaged with the third inner wall 22s.

Figure 11:
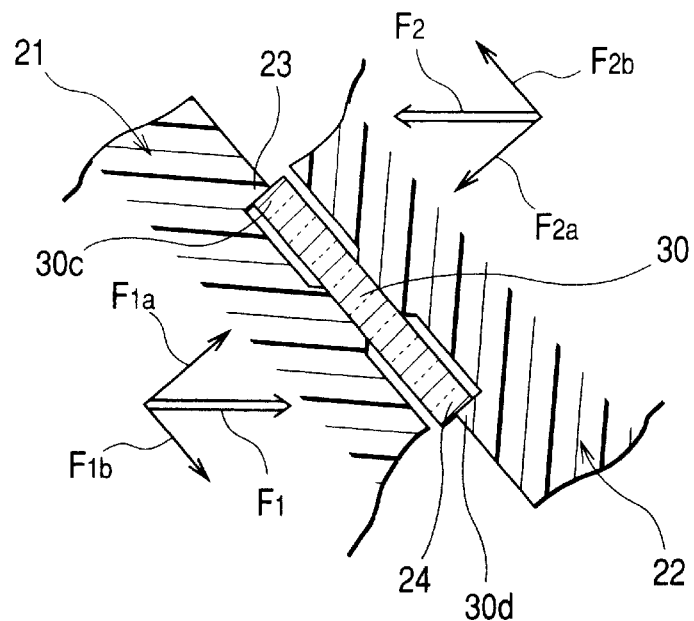
FIG. 11 is an explanatory diagram showing enlarged cross sections of main components used in an assembly of the frame shown in FIG. 10.

Let a notation F1 shown in FIG. 11 denote a pressing force applied at that time. In this case, the optical filter 30 is held between the protrusion 21i of the first frame member 21 and a flat surface inside the depressions 22i of the second frame member 22 with the protrusion 21i and the flat surface applying pressing forces F1a and F2a to the front surface 30a and the back surface 30b of the optical filter 30 respectively where the pressing force F1a is a vector component of the pressing force F1 and the pressing force F2a is a reaction force against the pressing force F1a.

It should be noted that FIG. 11 shows the pressing force F1 in terms of their vector components F1a and F1b as well as a reaction force F2 against the pressing force F1 in terms of their vector components F2a and F2b where the vector components F1a and F2a are both perpendicular to the first installation surface 21i d and the second installation surface 22d while the vector components F1b and F2b are both parallel to the first installation surface 21d and the second installation surface 22d.

In addition, the side-end surface 30c and the side-end surface 30d of the optical filter 30 are brought into contact with the step portion 23 of the first frame member 21 and the step portion 24 of the second frame member 22. As a result, the optical filter 30 is pressed by forces in four directions, being held surely between the protrusion 21i, the flat surface inside the depressions 22i, the step portion 23 and the step portion 24.

In this way, the optical filter 30 is surely held firmly in the frame 20 without using any adhesive agent.

Next, the frame 20 accommodating the optical filter 30 is inserted into the protruding piece 12f of the lower case 12a by bringing the side plate 21p of the first frame member 21 as well as a portion of the first sidewall 21b of the first frame member 21 into contact with one of the pieces 12f and sliding the side plate 21p as well as the portion of the first sidewall 21b along the piece 21f, while bringing the second sidewall 22b of the second frame member 22 as well as an outer wall of its cylindrical portion into contact with the other piece 12f and sliding along the second sidewall 22b as well as the outer wall along the other piece 12f.

The side plate 21p, the first sidewall 21b and the second sidewall 22b which form outer walls of the frame 20 flexibly deform and broaden the protruding piece 12f in an external direction. Thus, the bottom surface of the frame 20 is brought into contact with the top surface of the bottom 12d, firmly positioning the frame 20.

Next, the upper case 12b is put on the lower case 12a. While the protrusion 12g of the upper case 12b is being pressed downward against the top surface of the frame 20, the upper case 12b is firmly attached to an engagement member not shown in the figure to complete the assembly of the beam-splitting/coupling apparatus 10.

Next, an operation to split an incident beam hitting the beam-splitting/coupling apparatus 10 is explained.

First of all, three optical fibers with ferrules provided at their ends are inserted into the first, second and third installation holes 16a, 16b and 16c respectively by engaging the ferrules of the optical fibers inside the first, second and third installation holes 16a, 16b and 16c.

For example, a beam emitted from the end of the core of the optical fiber installed on the first installation hole 16a after propagation along the core travels through the through hole 40 of the frame 20 and then enters the optical filter 30. Optical components of the beam incident to the optical filter 30, which each have a wavelength in a predetermined wavelength range, propagate along the continuation through hole 40 and then enter the core end of the optical fiber installed at the second installation hole 16b. On the other hand, optical components each having a wavelength outside the predetermined wavelength range are reflected by the optical filter 30 and then propagate along the through hole 41, entering the core end of the optical fiber installed at the third installation hole 16c. In this way, a beam propagating through an optical fiber is split into two beams traveling along two other optical fibers respectively.

The beam-splitting/coupling apparatus 10 having the configuration and the function described above exhibits the following effects.

1: When the optical filter 30 is put between the first frame member 21 and the second frame member 22 in the assembly process, an adhesive agent or an adhesive member such as a soldering material is not required and yet the assembly work to fix the optical filter 30 can be carried out with ease. In addition, since neither adhesive material nor adhesive agent is applied to the optical filter 30, there is no effect on the front surface 30a and the back surface 30b, which each serve as an optical functional surface. Thus, an optical transmission loss can be avoided.

2: Since the first installation surface 21d of the first frame member 21 and the second installation surface 22d of the second frame member 22 are each formed in a slanting orientation relative to the incorporation direction, pressing forces are applied to the optical filter 30 in the direction of the front surface 30a and the back surface 30b and smaller than pressing forces applied to the first frame member 21 and the second frame member 22. Thus, a distortion caused by an excessive external force can be suppressed. As a result, good optical performance can be maintained.

3: By merely dropping the optical filter 30 into the inside of the rectangular recess 22t of the second frame member 22, the rectangular recess 22t causes the optical filter 30 to be mounted on the protrusion 22v formed on the rectangular recess 22t and to be positioned at a location in the transversal direction. Thus, the installation work can be done more easily with a higher degree of precision.

4: The step portions 23 and 24 are formed on the first frame member 21 and the second frame member 22 respectively, protruding from one end of the first installation surface 21d and one end of the second installation surface 22d respectively. The side-end surface 30c and the side-end surface 30d of the optical filter 30 are brought into contact with the step portions 23 and 24 respectively in order to restrict the movement of the optical filter 30. Since pressing forces are also applied to the front surface 30a and the back surface 30b of the optical filter 30 to put the optical filter 30 between the first frame member 21 land the second frame member 22, the optical filter 30 is supported firmly from four directions. As a result, the optical filter 30 can be positioned with a high degree of precision.

It should be noted that, by making at least one of the step portions 23 and 24, the protrusion 21i of the first frame member 21 and the protrusions 22i of the second frame member 22 of materials each having a high friction coefficient, the effects described above can be further enhanced.

5: By inserting the outer walls of the frame 20 accommodating the optical filter 30 between the pair of protruding pieces 12f of the case 12 while bringing the outer walls into contact with the protruding pieces 12f and sliding along the protruding pieces 12f, the optical filter 30 mounted in the frame 20 without using an adhesive member is tightened further firmly by the protruding pieces 12f by being pressed by external flexible pressures. Thus, the optical filter 30 can be held more reliably.

Figure 12:
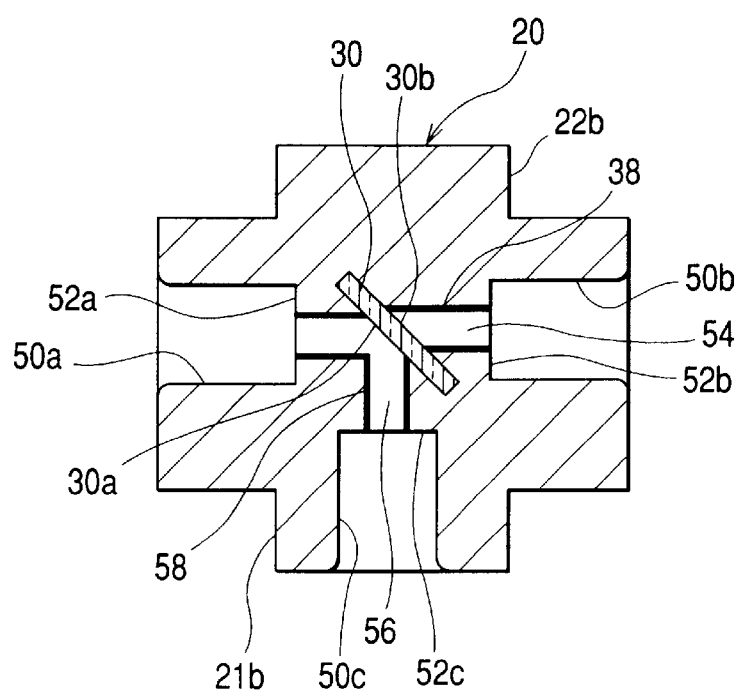
FIG. 12 is a schematic diagram showing a cross section of a frame of a beam-splitting/coupling apparatus, which is implemented by another embodiment of the present invention.
Figure 13:
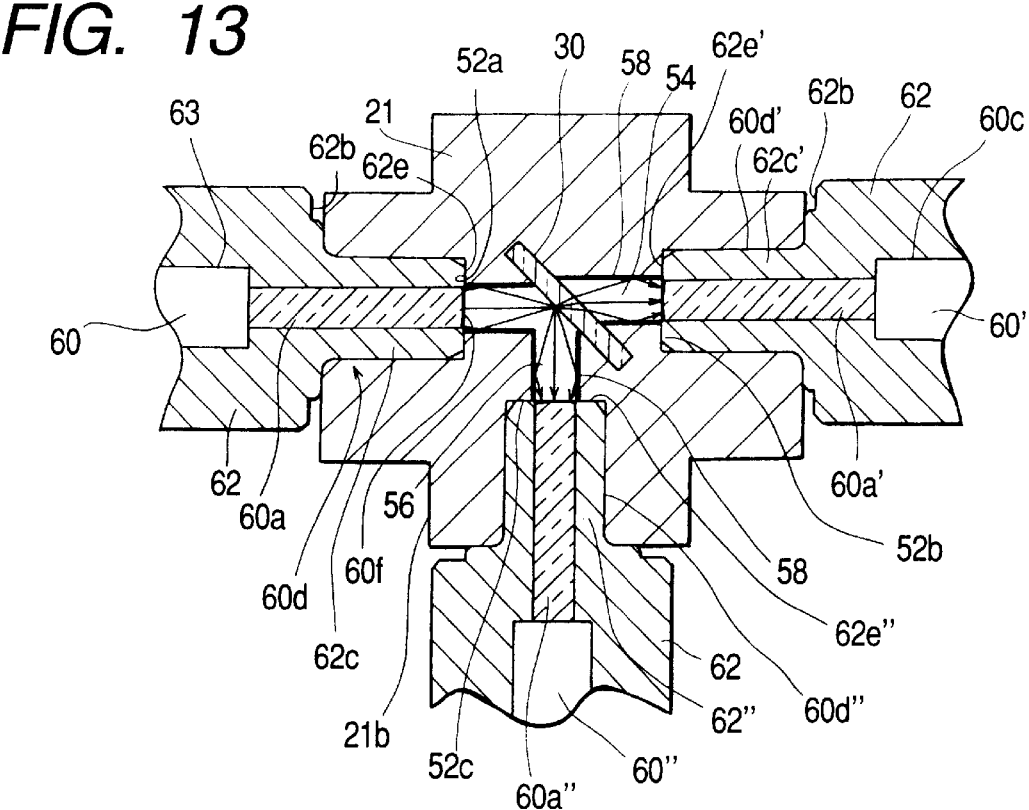
FIG. 13 is a schematic diagram showing a cross section of a state of optical fibers plugged into the beam-splitting/coupling apparatus, which is implemented by the other embodiment of the present invention.
Figure 14:
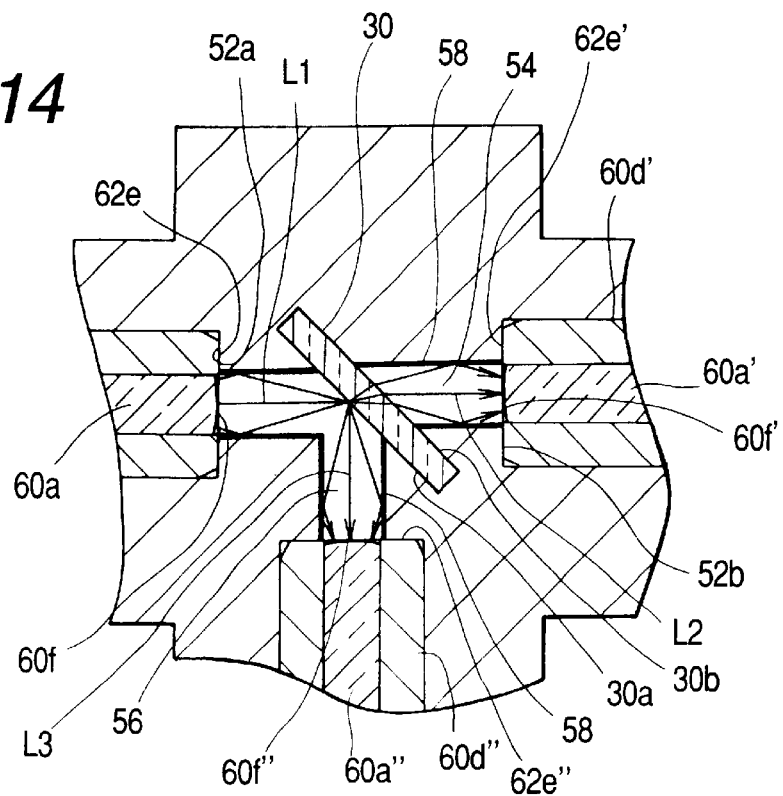
FIG. 14 is a diagram showing enlarged cross sections of main components composing the beam-splitting/coupling apparatus implemented by the other embodiment of the present invention as shown in FIG. 13.

Next, another embodiment of the present invention is explained by referring to FIGS. 12 to 14. The other embodiment's components identical with those of the embodiment explained previously are denoted by the same reference numerals as the latter, and their explanation is not repeated. FIG. 12 is an explanatory diagram showing a cross section of a state in which the first frame member 21 and the second frame member 22 are combined to sandwich the optical filter 30. As shown in FIG. 12, inside the main body of the frame 20, first, second and third bottoms 52a, 52b and 52c each having a planar shape are provided on the deepest portions of first, second and third openings 50a, 50b and 50c respectively.

A first through hole 54 having a diameter smaller than those of the first opening 50a and the second opening 50b is formed, starting from the first bottom 52a and ending at the second bottom 52b. The diameter of the first through hole 54 is made equal to the diameter of the core 60a of first and second optical fiber 60 and 60'.

In addition, a second through hole 56 having a diameter smaller than that of the third opening 50c is formed, starting from the third bottom 52c and ending at the first through hole 54. The second through hole 56 is linked to the first through hole 54 smoothly, with the former and the latter forming an approximately right angle. The diameter of the second through hole 56 is made equal to the diameter of the core 60a" of a third optical fiber 60".

The inner walls of the first through hole 54 and the second through hole 56 are each plated with a silver (Ag) film 58 having a thickness in the range 2 to 4 microns as a reflective member. For a beam with a wavelength in the range 400 to 800 microns, the Ag coating film 58 exhibits a reflectance value in the range 86.2% to 98%. It should be noted, however, that the reflective member is not limited to the Ag coating film 58. For example, it is also possible to use an aluminum (Al) coating film displaying a characteristic of a reflectance value in the range 72.4% to 86.9% for a beam with a wavelength in the range 400 to 800 microns as a reflective member.

The frame 20 is sandwiched by the lower case 12a and the upper case 12b to form a beam-splitting/coupling apparatus.

The following description explains the operation carried out by the beam-splitting/coupling apparatus 10 with a plurality of optical fibers 60 to split an optical beam L1.

First of all, ends 60d, 60d' and 60d" of the first, second and third optical fibers 60, 60' and 60" respectively are inserted into the first, second and third installation holes 16a, 16b and 16c of the case 12 shown in FIG. 1 respectively. End surfaces 62e, 62e' and 62" of cylindrical members 62c, 62c' respectively of the first, second and third optical fibers 60, 60' and 60" respectively, which are shown in FIGS. 13 and 14, are brought into contact with the first, second and third bottoms 52a, 52b and 52c respectively. The main bodies 62a of ferrules 62 of the first, second and third optical fibers 60, 60' and 60" are held in a snap manner inside the first, second and third installation holes 16a, 16b and 16c respectively by flexible members not shown in the figures. In this state, the cylindrical members 62c, 62c' and 62c" forming the ends 60d, 60d' and 60d" of the first, second and third optical fibers 60, 60' and 60" respectively are engaged in the first, second and third openings 50a, 50b and 50c respectively.

End surfaces 60f and 60f' of the cores 60a and 60a' of the first and second optical fibers 60 and 60' respectively coincide with the opening ends of the first through hole 54. Similarly, an end surface 60f" of the core 60a" of the third optical fibers 60" coincides with the opening end of the second through hole 56.

After inserting the first, second and third optical fibers 60, 60' and 60" into the beam-splitting/coupling apparatus 10, an optical beam L1 propagating along the core 60a of the first optical fiber 60 is emitted from the end surface 60f of the core 60a.

As shown in FIG. 14, the optical beam L1 emitted from the end surface 60f of the core 60a in a radiated and spread state moves forward while being reflected by the Ag coating film 58 formed on the inner-wall surface of the first through hole 54, hits the front surface 30a of the optical filter 30.

Optical components of the incident optical beam L1 entering the front surface 30a, which each have a wavelength in a specific wavelength range, is emitted from the back surface 30b of the optical filter 30 as an optical beam L2. An example of such components is a blue optical component.

Some of the optical beam L2 propagates directly toward the end surface 60f' of the core 60a' of the second optical fiber 60' while the rest arrives at the end surface 60f' of the core 60a' of the second optical fiber 60' after being reflected a number of times by the Ag coating film 58 formed on the inner-wall surface of the first through hole 54.

On the other hand, optical components of the incident optical beam L1 entering the front surface 30a, which each have a wavelength in the specific wavelength range, is reflected by the front surface 30a of the optical filter 30 as an optical beam L3. An example of such components is a red optical component. Some of the optical beam L3 propagates directly toward the end surface 60f" of the core 60a" of the core 60a" of the third optical fiber 60" after being reflected a number of times by the Ag coating film 58 formed on the inner-wall surface of the second through hole 56.

Since the Ag coating film has a reflectance value in the range 86.2%, an optical beam can be propagated through the first through hole 54 and the second through hole 56 while the optical propagation loss is being kept at a small value.

Preferred embodiments have been explained so far. It should be noted, however, that the scope of the present invention is not limited to the embodiments. Instead, changes and modifications can be made to the embodiments as long as the changes and the modifications are within a range not departing from the true spirit of the present invention.

The beam-splitting/coupling apparatus of the present invention described above comprises first and second frame members which each have a contact surface and a beam guide path. An optical filter is provided between the contact surfaces with the front and rear surfaces of the optical filter held by the first and second frame members respectively. The first and second frame members are held in a case by external flexible forces. A beam propagates from the beam guide path of the first frame member to the beam guide path of the second frame member by way of the optical filter. In such a configuration, the components of the beam-splitting/coupling apparatus can be assembled and fixed with ease. In addition, since the front and rear surfaces of the optical filter can be held by flexible pressures with ease, there is no negative effect on the optical performance.

In addition, a pair of walls is set in the case with the walls separated from each other. The first and second frame members are provided in the case with the outer wall portions of the first and second frame members held between the walls. Thus, optical filter held between the first and second frame members can be supported more firmly.

The contact surfaces of the first and second frame members are each formed in a slanting orientation relative to a direction in which the contact surfaces are confronted with each other. A step portion is formed on each of the contact surfaces. The mutually facing side surfaces of the optical filter are held by external flexible forces. As a result, since the front and rear surfaces as well as the side surfaces of the optical filter are held firmly from four directions, the optical filter is positioned with a high degree of precision.

A protrusion is formed on at least one of the contact surfaces of the first and second members. The low edge surface of the optical filter is mounted on this protrusion. Since the optical filter is positioned in the transversal direction in this way, the filter can be prevented from falling down. Thus, the assembly work can be carried out more easily.

What is claimed is:

1. A beam-splitting/coupling apparatus, comprising a first frame member having a contact surface as well as a beam guide path and a second frame member also having a contact surface as well as a beam guide path, wherein:

an optical filter is provided between the contact surfaces with front and back surfaces of the optical filter are held between the first and second frame members;

the first and second frame members are each held inside a case by an external flexible pressure; and a beam from a beam guide path of the first frame member propagates to a beam guide path of the second frame member by way of the optical filter; and wherein:

the contact surfaces of the first and second frame members are each formed in a slanting orientation relative to a direction in which the contact surfaces are confronted with each other;

a step portion is formed on each of the contact surfaces; and mutually facing side edge surfaces of the optical filter are held between the step portions external flexible pressures.

2. A beam-splitting/coupling apparatus, comprising a first frame member having a contact surface as well as a beam guide path and a second frame member also having a contact surface as well as a beam guide path, wherein:

an optical filter is provided between the contact surfaces with front and back surfaces of the optical filter are held between the first and second frame members;

the first and second frame members are each held inside a case by an external flexible pressure; and a beam from a beam guide path of the first frame member propagates to a beam guide path of the second frame member by way of the optical filter; and wherein a protrusion is formed on at least one of the contact surfaces of the first and second frame members and a low-edge surface of the optical filter is mounted on the protrusion.

* * * * *